Feb. 4, 1969     H. A. BALO     3,426,322

TURBOJET COMPRESSOR STALL WARNING INDICATOR

Filed Oct. 28, 1965

INVENTOR
HAROLD A. BALO

BY Melvin M. Goldberg.

ATTORNEY

United States Patent Office 3,426,322
Patented Feb. 4, 1969

3,426,322
TURBOJET COMPRESSOR STALL WARNING INDICATOR
Harold A. Balo, Cincinnati, Ohio, assignor to General Electric Company, a corporation of New York
Filed Oct. 28, 1965, Ser. No. 505,478
U.S. Cl. 340—27                    6 Claims
Int. Cl. G08g 5/00

This invention generally relates to a turbojet engine and more specifically to means to detect compressor stall in a turbojet engine.

One problem which has existed in a turbojet engine is that of compressor stall. Compressor stall can cause an increase in the exhaust gas temperature and a simultaneous severe reduction in cooling air normally supplied to a turbine wheel. In combination, these conditions can lead to turbine wheel failure if the compressor stall is not recognized and if corrective action is not taken quickly. Turbine wheel failure during engine operation can result in severe engine and aircraft damage.

Previous attempts to develop a stall warning indicator have used either engine operating presures or pressure ratios as the input parameters. However, these attempts have been unsuccessful because no dependable limits can be established which present a reliable indication of only compressor stall. For example, transient pressures or pressure ratios, which normally occur during safe engine operation, can provide a false indication of compressor stall. Further, the prior art attempts have required expensive aircraft modification prior to their installation.

Compressor stalls can be evidenced by certain engine r.p.m. and engine exhaust gas temperature relationships. If the engine throttle is in the cruse position or a higher position, low engine r.p.m. and a high exhaust gas temperature for that engine r.p.m. indicate compresor stall. Other indications of compressor stall are increased vibration, yaw, or loss of thrust. In the prior art the only manner of obtaining any compressor stall indication was by constant monitoring of these various conditions by aircraft personnel. If the vibration were not severe, if the yaw were not pronounced, or if crew duties prevented continuous instrument monitoring, undetected compressor stalls could result.

Therefore, it is an object of this invention to provide an automatic compressor stall warning indicator which substantially alleviates constant monitoring requirements of aircraft personnel during aircraft operation.

It is another object of this invention to provide an automatic compressor stall warning indicator which, by providing an immediate indication of compressor stall, improves aircraft flight safety.

Still another object of this invention is to provide a compressor stall warning indicator which is easily installed in an existing aircraft with little or no modification thereto.

Briefly stated, the compressor stall warning indicator comprises an indicating means, time delay means and two switching means. A first switching means is open at exhaust gas temperatures below a predetermined value and closed at temperatures above that value. The second switching means is open during engine operation below a first speed and above a second speed; it is closed between the first and second speeds. If the exhaust gas temperature exceeds the predetermined temperature while the engine is operating between the first and second speeds, both switching means will close concurrently and thereby energize the time delay means. If the switching means remain closed until the time delay means is actuated, the indicating means will be energized to notify aircraft personnel that the engine is in a compressor stall condition.

The novel features which are characteristics of this invention are set forth with particularity in the appended claims. The invention itself, however, as to its organization, together with further objects and advantages, may be understood by reference to the following description of a compressor stall warning indicator used in a turbojet engine taken in conjunction with the accompanying drawings and description.

Figure 1:
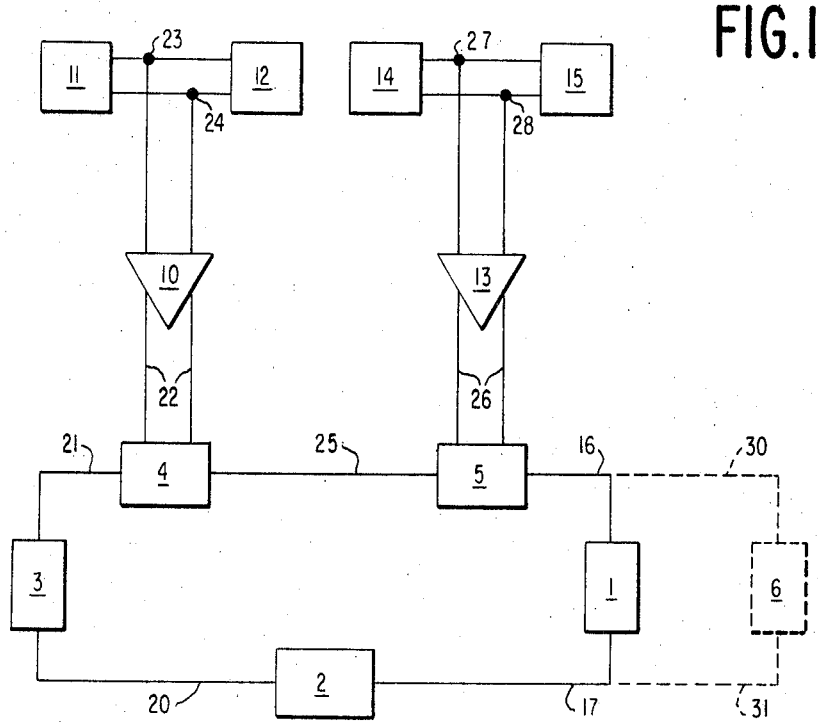
FIG. 1 illustrates a compressor stall warning indicator which is constructed in accordance with this invention.

Referring to FIG. 1, a compressor stall warning indicator is shown which comprises indicating means 1, time delay means 2, power supply 3, first controllable switching means 4, and second controllable switching means 5 in series. Optional memory means 6 can also be used in conjunction with indicating means 1. First switching means 4 is controlled by amplifier 10; and amplifier 10 is responsive to signals which are produced by exhaust gas temperature sensing means 11 and which are coupled to exhaust gas temperature readout means 12. Similarly, second switching means 5 is controlled by amplifier 13; and amplifier 13 is responsive to signals which are produced by r.p.m. sensing means 14 and which are coupled to r.p.m. readout means 15. Both sensing means 11 and 14 and both readout means 12 and 15 are normally installed in an aircraft as standard instrumentation, and both readout means 12 and 15 are normally readily accessible in the aricraft instrument panel.

More specifically, indicating means 1 can comprise a signal light, buzzer or other means which furnishes a clear indication of energization. Conductors 16 and 17 connect indicating means 1 to second switching means 5 and time delay means 2 respectively.

Time delay means 2 is constituted by any device which does not close a circuit until it has been energized for a predetermined period of time, such as time delay relays, multivibrator circuits or other means well-known in the art. In addition to being connected in series with indicating means 1 by conductor 17, time delay means 2 is joined in series with a suitable power supply 3 by conductor 20.

First switching means 4 represents "open-close" switching means such as a relay system, silicon controlled rectifier circuit or transistor circuit. Input conductors 22 couple first switching means 4 to amplifier 10, and input signals for amplifier 10 and obtained from terminals 23 and 24 which can be located on exhaust gas temperature readout means 12. In order that the effect of placing amplifier 10 in parallel with exhaust gas temperature readout means 12 should have a negligible effect on readings, amplifier 10 is designed to have an input impedance which is relatively high in comparison with the input impedance to exhaust gas tempeature readout means 12. Amplifier 10 closes first switching means 4 in response to a temperature indication which exceeds a predetermined value, $T_1$, and thereby effective joins second switching means 5 to power supply 3 by conductors 21 and 25.

Second switching means 5 likewise can comprise a transistor or silicon controlled rectifier circuit or relay system which is characterized by an "open-close-open" function. Second switching means 5 is coupled to amplifier 13 by conductors 26, and amplifier 13 is also connected to r.p.m. sensing means 14 and r.p.m. readout means 15 by terminals 27 and 28 which can be located on r.p.m. readout means 15. As with amplifier 10, amplifier 13 has an input impedance which is relatively high in comparison to that of r.p.m. readout means 15 so that the effect of adding amplifier 13 in parallel is negligible. Amplifier 13 closes switching means 5 when the engine exceeds a first speed, $\omega_1$, and opens the second switching means 5 when a second speed, $\omega_2$, is exceeded to thereby effectively connect conductors 25 and 16 when the engine is operating betwen $\omega_1$ and $\omega_2$.

Optional memory means 6 which can be connected in parallel with indicating means 1 by conductors 30 and 31 can comprise a solenoid operated shutter, tape recorder or other means to provide an indication that compressor stall has occurred. However, such a memory means should not be capable of being reset except by authorized personnel. When such a memory means 6 is used, positive readings are given after indicating means 1 is de-energized so that any deleterious effects of compressor stall can be corrected.

Figure 2:
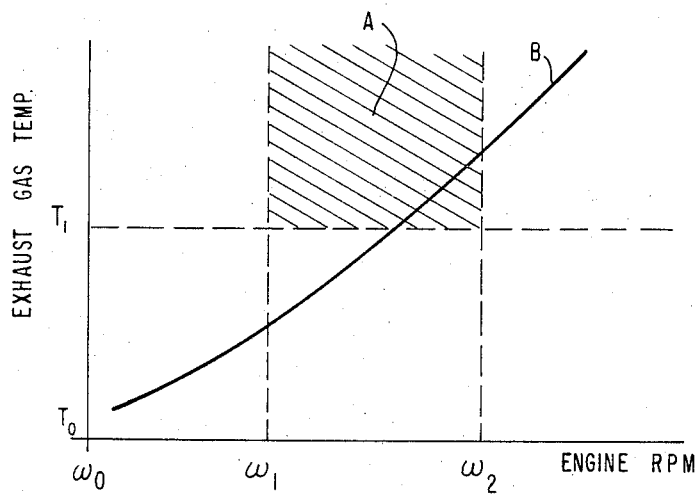
FIG. 2 is a graph which is useful because it illustrates the operation region of a compresor stall warning indicator constructed in accordance with this invention.

Referring to the operation of a compressor stall warning indicator as described above, as engine speed increases from idle, both switching means 4 and 5 are open. When the engine exceeds $\omega_1$, a signal from amplifier 13 closes second switching means 5 until the engine exceeds $\omega_2$ whereupon second switching means 5 opens again. At temperatures below $T_1$ first switching means 4 is open, but first switching means 4 closes at temperatures above $T_1$. FIG. 2 represents a graphical analysis of the compressor stall warning indicator operation in terms of exhaust gas temperature and engine r.p.m. A crosshatched area A defined by $\omega_1$, $\omega_2$, and above $T_1$ represents the area in which first and second switching means 4 and 5 are closed concurrently. For example, in one particular turbojet engine, $\omega_1$ is 60% of the maximum engine speed; $\omega_2$ is 85% of the maximum engine speed; $T_1$ is 575° C.; and the time delay is 10 seconds. During normal acceleration, represented by curve B, the period during which the exhaust gas temperature exceeds $T_1$ concurrently with an engine r.p.m. between $\omega_1$ and $\omega_2$ is less than 10 seconds so time delay means 2 is not closed. Therefore, indicating means 1 remains inoperative. However, if compressor stalls should exist, the engine r.p.m. and exhaust gas temperature place the engine operation within area A for a period greater than 10 seconds. Under these conditions time delay means 2 closes so that indicating means 1 is energized to indicate to the pilot that immediate corrective action should be taken.

Summarizing, the compressor stall warning indicator provides an indication of engine operating characteristics which can be caused by compressor stall and which are indicated by a certain relationship between engine speed and exhaust gas temperature in a turbojet. The indicator basically comprises first and second switching means which are responsive to signals from exhaust gas temperature sensing means and engine r.p.m. sensing means and which are directly coupled to readout means disposed in an aircraft instrument panel. Transient operation, which can occur in this range and which is not harmful, does not provide an indication of compressor stall because a time delay means is inserted in series with the indicating means. Only when the time delay means has been energized continuously for its full period does the indicator become energized.

While the present invention has been described with reference to a particular system for a particular purpose, various modifications may be made by those skilled in the art without actually departing from the spirit and scope of the invention.

What I claim as new and desire to secure by Letters Patent of the United States is:

1. A compressor stall warning indicator for a turbojet engine comprising:
   (a) engine speed sensing means producing a first output signal between first and second engine speeds;
   (b) engine exhaust gas temperature sensing means producing a second output signal above a predetermined exhaust gas temperature; and
   (c) utilization means coupled to said speed sensing means and temperature sensing means and responsive to sustained, concurrent application of said first and second output signals to produce an indication of compressor stall.

2. A compressor stall warning indicator as recited in claim 1, wherein said engine speed sensing means comprises an open-close-open switching means and means coupled to an engine speed readout means to operate said switching means, said switching means providing said first output signal between the first and second engine speeds.

3. A compressor stall warning indicator as recited in claim 1, wherein said temperature sensing means includes an open-close switching means and means coupled to an exhaust gas temperature readout means to operate said switching means, said switching means providing said second output signal above the predetermined exhaust gas temperature.

4. A compressor stall warning indicator as recited in claim 1, wherein said utilization means comprises time delay means and indicating means.

5. A compressor stall warning indicator as recited in claim 4, wherein a memory means is coupled to said indicating means to provide a continuing indication that compressor stall has occurred after said indicating means has been de-energized.

6. A compressor stall warning indicator as recited in claim 4 wherein said engine speed sensing means, said engine exhaust temperature sensing means, said time delay means and said indicating means are in a series configuration.

References Cited

UNITED STATES PATENTS

| 2,995,929 | 8/1961 | Lindquist | 73—117.3 |
| 3,181,353 | 5/1965 | Brahm et al. | 73—117.3 |

ALVIN H. WARING, *Primary Examiner.*

U.S. Cl. X.R.

73—116, 346; 116—115; 340—57, 227